(12) United States Patent
Namikoshi

(10) Patent No.: US 11,106,383 B2
(45) Date of Patent: Aug. 31, 2021

(54) ROBOT CONTROL APPARATUS, AND METHOD AND PROGRAM FOR PRESERVING BACKUP FILE

(71) Applicant: Nidec Corporation, Kyoto (JP)

(72) Inventor: Takahiro Namikoshi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 292 days.

(21) Appl. No.: 16/270,655

(22) Filed: Feb. 8, 2019

(65) Prior Publication Data

US 2019/0272103 A1 Sep. 5, 2019

(30) Foreign Application Priority Data

Mar. 5, 2018 (JP) .............................. JP2018-038509

(51) Int. Cl.
*G06F 3/06* (2006.01)
*G06F 11/10* (2006.01)
*B25J 9/16* (2006.01)
*G06F 11/14* (2006.01)

(52) U.S. Cl.
CPC ............ *G06F 3/065* (2013.01); *B25J 9/1643* (2013.01); *G06F 3/0619* (2013.01); *G06F 3/0643* (2013.01); *G06F 3/0673* (2013.01); *G06F 11/1004* (2013.01); *G05B 2219/35278* (2013.01); *G05B 2219/50391* (2013.01)

(58) Field of Classification Search
CPC ...... G06F 3/065; G06F 3/0619; G06F 3/0643; G06F 11/1004; G06F 3/0673; G06F 11/1453; B25J 9/1643; B25J 9/16; B25J 9/1602; G05B 2219/50391; G05B 2219/35278
See application file for complete search history.

(56) References Cited

U.S. PATENT DOCUMENTS

2016/0004717 A1\* 1/2016 Singhal ................. H04L 67/303
707/692
2018/0018115 A1\* 1/2018 Ikegame ............... G06F 3/0619

FOREIGN PATENT DOCUMENTS

JP 2017-217734 A 12/2017

\* cited by examiner

*Primary Examiner* — Basil T. Jos
(74) *Attorney, Agent, or Firm* — Keating & Bennett, LLP

(57) ABSTRACT

A robot control apparatus includes a controller, a storage, a backup creation processor, a checksum creation processor, a comparison processor, and a preservation processor. The comparison processor compares a checksum of a current backup file created by the checksum creation processor and a checksum of a past backup file. When the checksum of the current backup file and the checksum of the past backup file are different, the preservation processor preserves the current backup file or a difference between the current backup file and the past backup file.

7 Claims, 5 Drawing Sheets

US 11,106,383 B2

ROBOT CONTROL APPARATUS, AND METHOD AND PROGRAM FOR PRESERVING BACKUP FILE

CROSS REFERENCE TO RELATED APPLICATIONS

This application claims the benefit of priority to Japanese Patent Application No. 2018-038509 filed on Mar. 5, 2018. The entire contents of this application are hereby incorporated herein by reference.

BACKGROUND OF THE INVENTION

1. Field of the Invention

The present disclosure relates to a robot control apparatus, and a method and program for preserving backup files.

2. Description of the Related Art

Generally, a robot control apparatus to control operation of a robot such as an industrial robot controls the robot according to a program and setting information. Japanese Patent Application Laid-Open No. 2017-217734 discloses a technique for preserving backups upon updating a program.

A program and setting information may be modified by a user of a robot. By preserving backups of a program or setting information before modification, it is possible to compare a program or setting information after the modification to the program or setting information before the modification when any problem occurs. It is also possible to allow a program or setting information being used to revert to the program or setting information before the modification.

However, preserving all backups on a regular basis results in an enormous amount of data being preserved.

SUMMARY OF THE INVENTION

A robot control apparatus according to an example embodiment of the present disclosure includes a controller, a storage, a backup creation processor, a checksum creation processor, a comparison processor, and a preservation processor. The controller controls operation of a robot. The storage stores an information set to control the operation of the robot. The backup creation processor creates a backup file of the information set. The checksum creation processor creates a checksum of the backup file. The comparison processor compares a checksum of a current backup file created by the checksum creation processor and a checksum of a past backup file. When the checksum of the current backup file and the checksum of the past backup file are different, the preserving processor preserves the current backup file or a difference between the current backup file and the past backup file.

The above and other elements, features, steps, characteristics and advantages of the present disclosure will become more apparent from the following detailed description of the example embodiments with reference to the attached drawings.

DETAILED DESCRIPTION OF THE PREFERRED EMBODIMENTS

Figure 1:
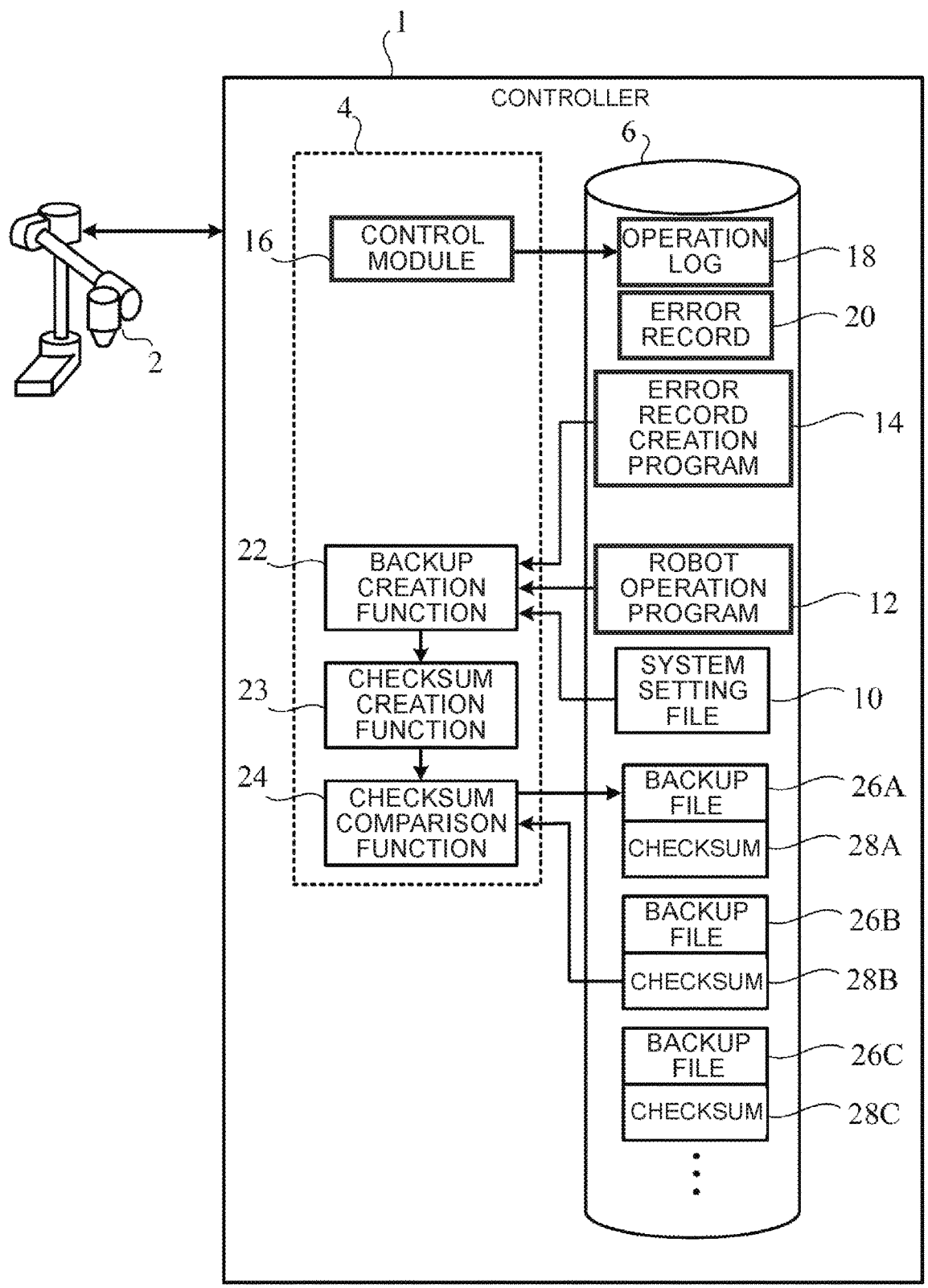
FIG. 1 is a block diagram showing a configuration of a robot control apparatus according to an example embodiment of the present disclosure.

FIG. 1 is a block diagram showing a configuration of a controller 1 of a robot control apparatus according to an embodiment of the present disclosure. According to this embodiment, the controller 1 controls and monitors a robot 2. The robot 2 is a manufacturing robot in a factory, for example, a multi-joint robot. That is, the robot 2 is not limited to being a multi-joint robot, but may be a numerical control machine tool for automatically performing work, for example, a numerical control lathe or a numerical control machining center. Also, the robot 2 is not limited to being a manufacturing robot but may include a carrier robot, an autonomous mobile robot, and other robots.

The controller 1 has a processor 4 and a memory 6 (a storage). The processor 4 is, for example, a central processing unit (CPU) and executes various programs stored in the memory 5 to perform various functional operations. The memory 6 may be, for example, an electrically erasable programmable read-only memory (EEPROM) and contain various data and programs used by the processor 4.

The controller 1 may be mounted on the robot 2 or may be installed separately from a processor mounted on the robot 2 to communicate with the processor mounted on the robot 2 in a wired or wireless manner. Also, the controller 1 may have the processor 4 mounted on the robot 2 and the memory 6 installed outside the robot 2.

The memory 6 contains a system setting file 10 (a setting information file or information set), a robot operation program 12 (an information set), an error record creation program 14 (an information set), and a backup creation program.

The system setting file 10 is a system control program for collectively controlling operation of the processor 4 and is referred to by the processor 4 to operate the processor 4. The processor 4 may operate properly by reading the system setting file 10 from the memory 6 and executing the read system setting file.

In FIG. 1, for convenience of description, the control module 16 is shown inside the processor 4. The control module 16 is a module or subroutine, which is a portion of the system setting file 10, and indicates a task executed by the processor 4. In detail, the control module 16 generates an operation log 18 indicating a history about the operation of the robot 2 and displays a task for preserving the operation log 18 in the memory 6. The processor 4 generates an operation log 18 according to the control module 16 and preserves the operation log 18 in the memory 6.

The processor 4 updates the operation log 18 by adding the contents of an information element to the operation log 18 in sequence according to the control module 16 and also updates the operation log 18 by deleting the contents of an information element for which a preservation period has elapsed. The information element of the operation log 18 may be, for example, coordinates of a predetermined position of the robot 2, a voltage given to an actuator (e.g., a motor) disposed at a predetermined position of the robot, a force or torque exerted by an actuator, a temperature of the robot 2, or the like. Since the operation log 18 preserved in the memory 6 indicates a history about the operation of the robot 2, an interpreter of the operation log 18 may track a behavior history of the robot 2 by using the operation log 18 and then specify a cause of an error when the error occurs in the robot 2.

The robot operation program 12 is referred to by the processor 4 in order to control the operation of the robot 2. By reading a robot operation program 12 from the memory 6 and executing the robot operation program 12, the processor 4 functions as a controller to control the operation of the robot 2 and instructs the robot 2 to execute a required task.

By reading an error record creation program 14 from the memory 6 and executing the error record creation program 14, the processor 4 creates an error record 20 related to an error separately from the operation log 18 when the error occurs. The processor 4 preserves the error record 20 in the memory 6.

The robot operation program 12 used in the controller 1 may be dedicated for each controller 1 and also may be modified by a user of the robot 2. Also, the system setting file 10 and the error record creation program 14 may be modified by a user of the robot 2. By preserving backups of a program or setting information before modification, it is possible to compare a program or setting information after the modification to the program or setting information before the modification when any problem occurs. It is also possible to allow a program or setting information being used to revert to the program or setting information before the modification.

Accordingly, by reading a backup creation program from the memory 6 and executing the backup creation program, the processor 4 according to this embodiment functions as a backup creation processor for creating a backup file for any one of the system setting file 10, the robot operation program 12, and the error record creation program 14. Also, according to the backup creation program, the processor 4 may function as a checksum creation processor for creating a checksum of the backup file. Also, the processor 4 functions as a comparison processor configured to compare a checksum of a current backup file, which is created by the checksum creation processor, to a checksum of a past backup file according to the backup creation program, and the processor 4 functions as a preservation processor configured to preserve the current backup file in the memory 6 when the checksum of the current backup file and the checksum of the past backup file are different.

In the memory 6, an immediately previously preserved backup file 26B is preserved in association with a checksum 28B of the backup file. In the memory 6, a further previously preserved backup file 26C is further preserved in association with a checksum 28C of the backup file 26C. In this way, back files and checksums are accumulated in the memory 6 without being overwritten.

In FIG. 1, a backup creation function 22, a checksum creation function 23, and a checksum comparison function 24, which are functions executed by the backup creation program, are shown inside the processor 4 for convenience. The backup creation function 22 may create a current backup file for at least one of the system setting file 10, the robot operation program 12, and the error record creation program 14. The checksum creation function 23 creates a checksum of the current backup file. The checkup comparison function 24 compares the checksum of the current backup file to a checksum 28B of an immediately previously preserved backup file 27B. When the checksum of the current backup file is different from the checksum of the past backup file, the checksum comparison function 24 preserves the current backup file 26A in the memory 6 in association with the checksum 28A of the backup file 26A.

Figure 2:
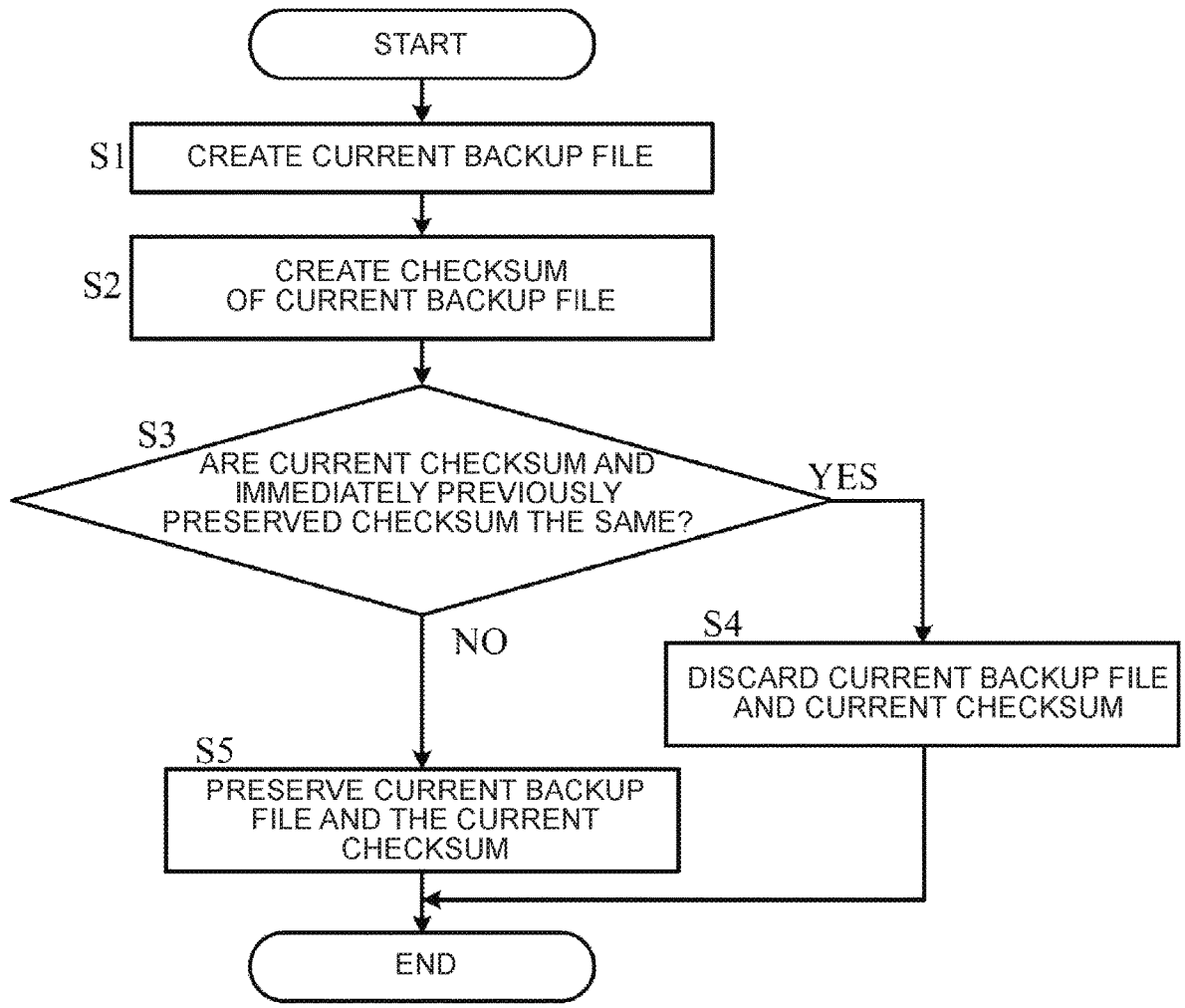
FIG. 2 is a flowchart showing a method of preserving a backup file in a robot control apparatus according to an example embodiment of the present disclosure.

FIG. 2 is a flowchart showing a method of preserving a backup file in a robot control apparatus according to an embodiment of the present disclosure. This method is performed by the processor 4 according to the backup creation program activated when the controller 1 is activated.

In step S1, when the controller 1 is activated, the processor 4 creates a current backup file for an information set of at least one of the system setting file 10, the robot operation program 12, and the error record creation program 14. Here, the current backup file may be a copy of the information set. However, the processor 4 may create the backup file by compressing the information set. By the compression, it is possible to decrease the amount of data of the backup file and also to reduce the processing burden for the checksum creation.

Subsequently, in step S2, the processor 4 creates a checksum of the current backup file. The checksum may be a sign of cyclic redundancy checking (CRC) or a hash value of Message Digest algorithm 5 (MD5).

Subsequently, in step S3, the processor 4 determines whether the checksum (the current checksum) created in step S2 is the same as a checksum 28B stored in the memory 6 (a checksum immediately previously preserved in the memory 6).

When the determination in step S3 is positive, the processing proceeds to step S4. In step S4, the processor 4 discards the current backup file created in step S1 and the checksum created in step S2. Then, the processing ends.

On the other hand, when the determination in step S3 is negative, the processing proceeds to step S5. In step S5, the processor 4 preserves, in the memory 6, the current backup file 26A created in step S1 and the checksum 28A created in step S2. After step S5, the processing ends.

In step S5, the processor 4 assigns date information indicating the date of preservation or creation to the backup file 26A and the checksum 28A and stores the date information in the memory 6. In step S3, by using the date information, an immediately previously preserved checksum 28B may be specified from among a plurality of checksums stored in the memory 6. Also, by using the date information, an interpreter may specify an order in which a plurality of backup files stored in the memory 6 are preserved or created.

When the information set is not updated, the determination in step S3 is positive, that is, the current checksum is the same as the immediately previously preserved checksum. When the information set is updated, the determination in step S3 is negative, that is, the current checksum is different from the immediately previously preserved checksum. Correspondingly, according to this embodiment, only when the information set is updated, the current backup file is preserved, and thus the amount of data preserved in the memory 6 is reduced. Also, according to this embodiment, the checksums are compared to each other, and thus the processing burden of the processor 4 is smaller than when the backup files are compared to each other.

As described above, this method is performed when the controller 1 is activated. Upon activation of the controller 1, the robot 2 is not activated, and thus the robot operation program 12 is not in operation. As described above, the processing burden of the controller 1 is small even if this method is performed. Also, by performing this method upon the activation, it is possible to suppress the frequency of the processing on the creation of the backup file and checksum and the comparison of the checksums. Also, by automatically performing this method whenever the controller 1 is activated, it is possible to prevent execution of backup from being forgotten.

However, this method is not limited to being performed when the controller 1 is activated, and for example, may be performed at any time. For example, when a user of the controller 1 gives a command to the processor 4, the processor 4 may perform this method. Alternatively, the processor 4 may periodically perform this method.

Figure 3:
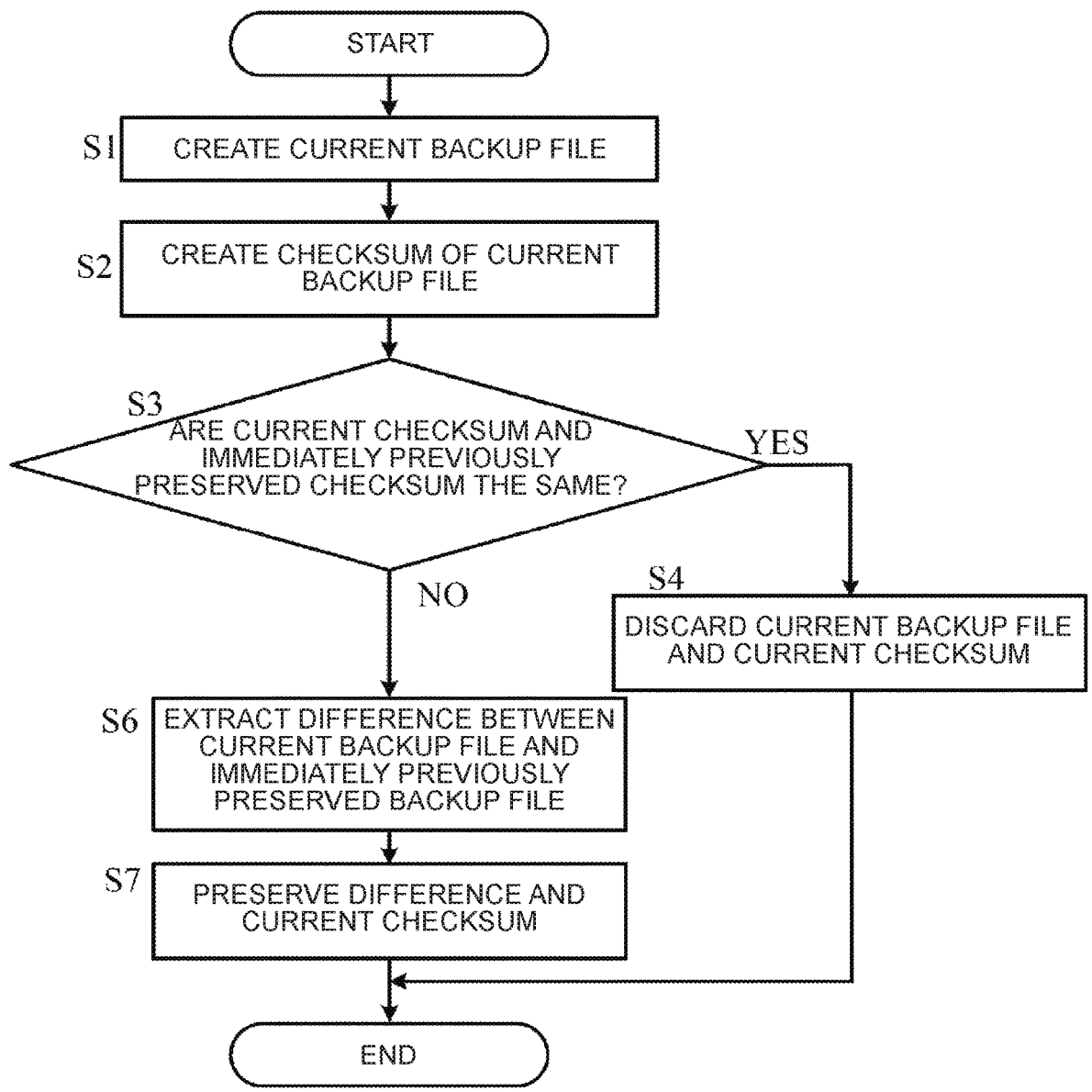
FIG. 3 is a flowchart showing another example of a method of preserving a backup file.

FIG. 3 is a flowchart showing another example of a method of preserving a backup file. In order to represent the same steps as those of FIG. 2, the same reference numbers are used, and descriptions thereof will be omitted.

In the method of FIG. 3, when the determination in step S3 is negative, the processing proceeds to step S6. In step S6, the processor 4 extracts a difference between the current backup file 26A created in step S1 and the immediately previously preserved backup file 26B.

Subsequently, in step S7, the processor 4 preserves, in the memory 6, the difference extracted in step S6 and the checksum 28A created in step S2. After step S7, the processing ends.

In step S7, the processor 4 may assign date information indicating the date of preservation or creation to the difference and the checksum 28A and stores the date information in the memory 6. In step S3, by using the date information, an immediately previously preserved checksum 28B may be specified from among a plurality of checksums stored in the memory 6. Also, by using the date information, an interpreter may specify an order in which a plurality of differences stored in the memory 6 are preserved or created.

When the method of FIG. 3 is used, an information set of any one generation before update (e.g., an initial information set) is preserved in advance in the memory 6. Such a prior information set may be preserved in a compressed format. However, the prior information set may be preserved in a storage medium other than the memory 6. An interpreter may reproduce the current backup file 26A and, further, the current information set on the basis of the prior information set and one or more differences stored in the memory 6.

In the method of FIG. 3, since the difference between the current backup file and the past backup file is preserved, the amount of data preserved is reduced. The difference may be in a text form, which may be read and understood by a person, or in a binary form, which may be read by a machine. When the backup file is in the compressed format, the difference may be in a binary form that cannot be understood by a person. However, an interpreter may reproduce the current information set by decompressing the backup file.

As described above, when a difference is found by the comparison of the checksums, the current backup file may be preserved in the memory 6, or the difference between the current backup file and the past backup file may be preserved in the memory 6.

Figure 4:
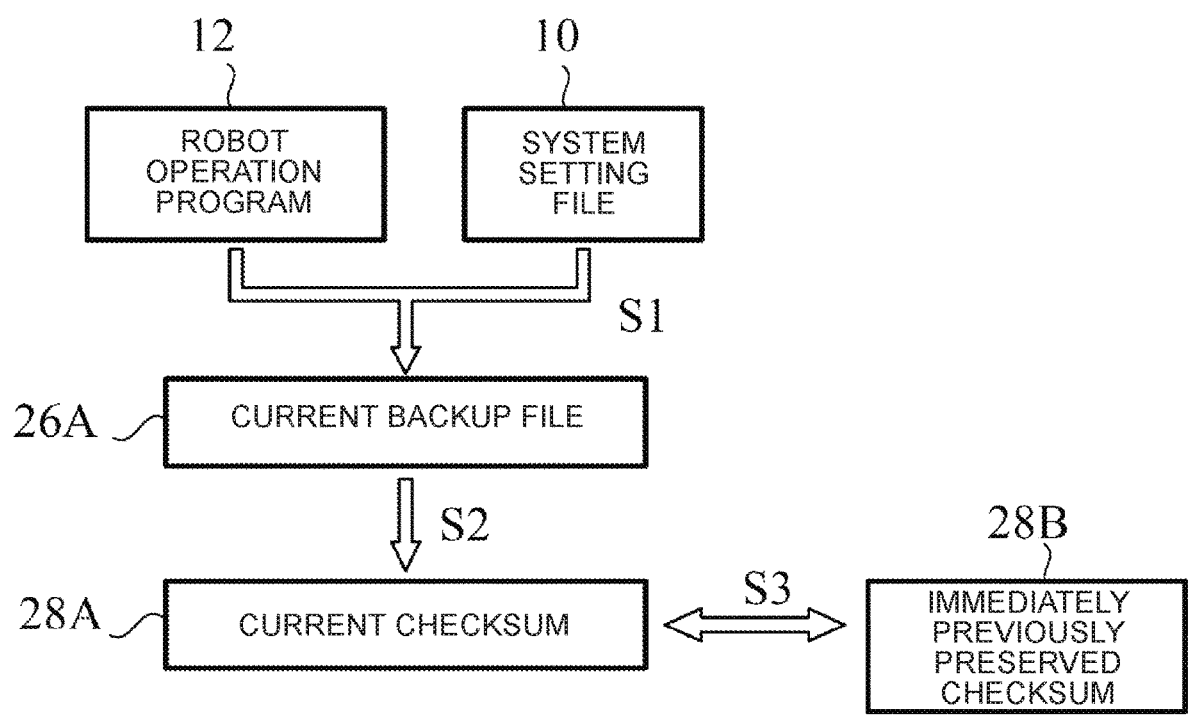
FIG. 4 is a schematic diagram showing a specific example of a method of preserving a single backup file for a plurality of information sets according to an example embodiment of the present disclosure.

When a backup file of a plurality of information sets (e.g., the system setting file 10 and the robot operation program 12) is created, a detailed example shown in the schematic diagram of FIG. 4 may be used. The system setting file 10 and the robot operation program 12 are illustrated below as the plurality of information sets, but the error record creation program 14 may be included in the plurality of information sets.

In the detailed example of FIG. 4, in step S1, the processor 4 combines the robot operation program 12 and the system setting file 10 and creates a current backup file 26A of the combined information set. In this case, the backup file 26A may be a combination of a copy of the robot operation program 12 and a copy of the system setting file 10 or a compressed-format file obtained by compressing the combination.

Subsequently, in step S2, the processor 4 creates the current checksum 28A which is a checksum of the current backup file 27A. Subsequently, in step S3, the processor 4 compares the current checksum 28A to an immediately previously preserved checksum 28B. According to the detailed example of FIG. 4, only a single checksum is created, and thus it is possible to reduce the processing burden for the checksum creation and the processing burden for the comparison between the current checksum and the past checksum.

Figure 5:
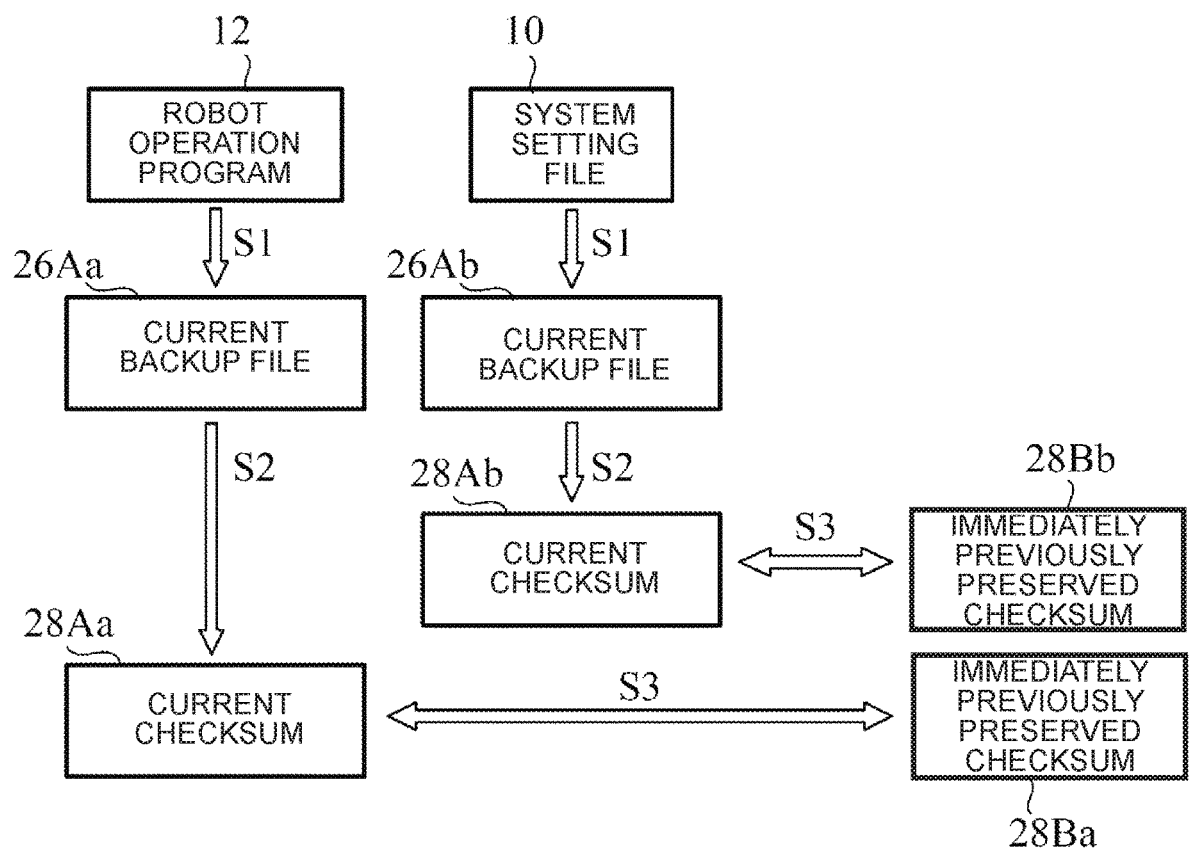
FIG. 5 is a schematic diagram showing a specific example of a method of preserving a plurality of backup files for a plurality of information sets according to an example embodiment of the present disclosure.

Alternatively, when the backup file of the plurality of information sets is created, a detailed example shown in the schematic diagram of FIG. 5 may be used. The system setting file 10 and the robot operation program 12 are illustrated below as the plurality of information sets, but the error record creation program 14 may be included in the plurality of information sets.

In the detailed example of FIG. 5, in step S1, the processor 4 generates a current backup file 26Aa of the robot operation program 12 and a current backup file 26Ab of the system setting file 10. The backup file 26Aa may be a copy of the robot operation program 12 or a compressed-format file obtained by compressing the robot operation program 12. The backup file 26Ab may be a copy of the system setting file 10 or a compressed-format file obtained by compressing the system setting file 10.

Subsequently, in step S2, the processor 4 creates a current checksum 28Aa, which is a checksum of the current backup file 26Aa. Also, in step S2, the processor 4 creates a current checksum 28Ab, which is a checksum of the current backup file 26Ab.

Also, in step S3, the processor 4 compares a checksum 28Aa of the current backup file 26Aa of the robot operation program 12 and a checksum 28Ba of the backup file of the immediately previously preserved robot operation program 12. When the checksums 28Aa and 28Ba are the same, the backup file 26Aa and the checksum 28Aa are discarded. On the other hand, when the checksums 28Aa and 28Ba are different, the processor 4 may preserve the current backup file 26Aa in the memory 6 or may preserve a difference between the current backup file 26Aa and the backup file of the immediately previously preserved robot operation program 12 in the memory 6.

Also, in step S3, the processor 4 compares a checksum 28Ab of the current backup file 26Ab of the system setting file 10 and the checksum 28Bb of the backup file of the immediately previously preserved system setting file 10. When the checksums 28Ab and 28Bb are the same, the backup file 26Ab and the checksum 28Ab are discarded. On the other hand, when the checksums 28Ab and 28Bb are different, the processor 4 may preserve the current backup file 26Ab in the memory 6 or may preserve a difference between the current backup file 26Ab and the backup file of the immediately previously preserved system setting file 10 in the memory 6. According to a detailed example of FIG. 5, there is no burden for the combination between the robot operation program 12 and the setting information file.

<Another Modification>

Although the embodiment of the present disclosure has been described above, the above description does not limit the present disclosure, and various modifications including deletion, addition, and substitution of elements are considered within the technical scope of the present disclosure.

For example, according to this embodiment, a system setting file 10, a robot operation program 12, an error record creation program 14, an operation log 18, an error record 20, a backup creation program, backup files 26A, 26B, . . . , and checksums 28A, 28B, . . . are contained in one memory 6. However, the components may be contained in different memories.

In the controller 1, each function executed by the processor 4 may be executed by a hardware device, instead of a processor, and may be executed by, for example, a programmable logic device such as a field programmable gate array (FPGA), a digital signal processor (DSP), and the like.

Although not shown, the controller 1 may be connected to a management apparatus via a network (e.g., the Internet). In this case, the processor 4 may transmit the backup files 26A, 26B, . . . to the management apparatus. In this case, an interpreter may track an update history of the information set in the controller 1 by using the backup files 26A, 26B, . . . , instead of going to a place where the controller 1 exists and thus may specify a cause of a problem that occurs in the robot 2.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A robot control apparatus comprising:
   a controller to control operation of a robot;
   a storage to store an information set to control the operation of the robot;
   a backup creation processor to create a backup file of the information set;
   a checksum creation processor to create a checksum of the backup file;
   a comparison processor to compare a checksum of a current backup file created by the checksum creation processor and a checksum of a past backup file; and
   a preservation processor to preserve the current backup file or a difference between the current backup file and the past backup file when the checksum of the current backup file and the checksum of the past backup file are different; wherein
   upon activation of the robot control apparatus:
      the backup creation processor creates the backup file;
      the checksum creation processor creates the checksum;
      the comparison processor compares the checksum of the current backup file and the checksum of the past backup file; and
      the preservation processor preserves the current backup file or the difference.

2. The robot control apparatus of claim 1, wherein the preservation processor preserves the difference between the current backup file and the past backup file when the checksum of the current backup file and the checksum of the past backup file are different.

3. The robot control apparatus of claim 1, wherein the backup creation processor combines a robot operation program referenced by the controller to control the operation of the robot and a setting information file referenced by the controller for the operation of the controller to create a backup file of a combined information set.

4. The robot control apparatus of claim 1, wherein
   the backup creation processor creates a backup file of the robot operation program referenced by the controller to control the operation of the robot and a backup file of the setting information file referenced by the controller for the operation of the controller;
   the checksum creation processor creates a checksum of the backup file of the robot operation program and a checksum of the backup file of the setting information file; and
   the comparison processor compares a checksum of a current backup file of the robot operation program and a checksum of a past backup file of the robot operation program and compares a checksum of a current backup file of the setting information file and a checksum of a past backup file of the setting information file.

5. The robot control apparatus of claim 1, wherein the backup creation processor creates the backup file by compressing the information set.

6. A method of preserving a backup file, the method comprising:
   creating a backup file of an information set to control operation of a robot;
   creating a checksum of the backup file;
   comparing a checksum of a created current backup file and a checksum of a past backup file;
   preserving the current backup file or a difference between the current backup file and the past backup file when the checksum of the current backup file and the checksum of the past backup file are different; and
   discarding the current backup file when the checksum of the current backup file and the checksum of the past backup file are the same; wherein
   all of the creating of the backup file of the information set, the creating of the checksum of the backup file, the comparing of the checksum of the created current backup file and the checksum of the past backup file, and the preserving of the current backup file or the difference between the current backup file and the past backup file are performed upon activation of a robot control apparatus of the robot.

7. A non-transitory computer readable medium including a program enabling a computer to execute functions comprising:
   creating a backup file of an information set to control operation of a robot;
   creating a checksum of the backup file;
   comparing a checksum of a created current backup file and a checksum of a past backup file;
   preserving the current backup file or a difference between the current backup file and the past backup file when the checksum of the current backup file and the checksum of the past backup file are different; and
   discarding the current backup file when the checksum of the current backup file and the checksum of the past backup file are the same; wherein
   all of the creating of the backup file of the information set, the creating of the checksum of the backup file, the comparing of the checksum of the created current backup file and the checksum of the past backup file, and the preserving of the current backup file or the difference between the current backup file and the past backup file are performed upon activation of a robot control apparatus of the robot.

* * * * *